US008681352B2

(12) United States Patent
Shenoy et al.

(10) Patent No.: US 8,681,352 B2
(45) Date of Patent: Mar. 25, 2014

(54) PULL BASED COMPUTER OUTPUT DEVICES

(75) Inventors: Rajesh K. Shenoy, San Jose, CA (US);
Keith E. Moore, Santa Clara, CA (US);
Emiliano Bartolome, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1383 days.

(21) Appl. No.: 10/125,804

(22) Filed: Apr. 18, 2002

(65) Prior Publication Data

US 2003/0197887 A1    Oct. 23, 2003

(51) Int. Cl.
G06F 3/12       (2006.01)
G06K 15/00    (2006.01)
G06F 15/173  (2006.01)

(52) U.S. Cl.
USPC ......... 358/1.15; 358/1.1; 358/1.13; 358/1.16; 709/223; 709/226

(58) Field of Classification Search
USPC ........................................ 705/64; 358/1.15
See application file for complete search history.

(56) References Cited

U.S. PATENT DOCUMENTS

| | | | |
|---|---|---|---|
| 4,829,468 A | 5/1989 | Nonaka et al. | 364/900 |
| 5,287,194 A * | 2/1994 | Lobiondo | 358/296 |
| 5,566,278 A | 10/1996 | Patel et al. | 395/114 |
| 5,580,177 A | 12/1996 | Gase et al. | 400/61 |
| 5,602,974 A | 2/1997 | Shaw et al. | 395/114 |
| 5,619,649 A | 4/1997 | Kovnat et al. | 395/200.01 |
| 5,689,755 A | 11/1997 | Ataka | |
| 5,699,495 A | 12/1997 | Snipp | 395/114 |
| 5,832,191 A * | 11/1998 | Thorne | 358/1.15 |
| 5,845,058 A | 12/1998 | Shaw et al. | 395/114 |
| 5,881,213 A | 3/1999 | Shaw et al. | 395/114 |
| 5,897,260 A | 4/1999 | Zingher | 400/719 |
| 5,960,168 A | 9/1999 | Shaw et al. | 395/114 |
| 5,978,559 A | 11/1999 | Quinion | 395/114 |
| 5,982,996 A | 11/1999 | Snyders | 395/114 |
| 5,995,793 A | 11/1999 | Enomoto et al. | 399/302 |
| 6,024,284 A * | 2/2000 | Schmid et al. | 235/462.46 |
| 6,055,063 A | 4/2000 | Yang et al. | 358/1.15 |
| 6,075,615 A | 6/2000 | Nakamura | 358/1.14 |
| 6,201,611 B1 | 3/2001 | Carter et al. | 358/1.15 |
| 6,219,148 B1 | 4/2001 | Takashima | 358/1.15 |

(Continued)

FOREIGN PATENT DOCUMENTS

EP    0917042 A2    5/1999
EP    0935182           8/1999

(Continued)

OTHER PUBLICATIONS

Microsoft, Windows 95 Printing and Fonts: The Basics, http://www.microsoft.com/technet/archive/win95/rk23_prt.mspx (pp. 3-4).*

(Continued)

*Primary Examiner* — Vincent Rudolph

(57) ABSTRACT

A presentation output system includes a digital computer network, one or more job submission clients, and a job store. The job store accepts and holds output jobs from the plurality of job submission clients. The presentation output system further includes one or more presentation output devices that pull the output jobs from the job store for outputting.

60 Claims, 6 Drawing Sheets

(56) References Cited

U.S. PATENT DOCUMENTS

| | | | |
|---|---|---|---|
| 6,219,151 B1 | 4/2001 | Manglapus et al. | |
| RE37,258 E | 7/2001 | Patel et al. | 358/1.15 |
| 6,266,150 B1 | 7/2001 | Brossman et al. | 358/1.15 |
| 6,375,874 B1* | 4/2002 | Russell et al. | 264/28 |
| 6,552,813 B2* | 4/2003 | Yacoub | 358/1.1 |
| 6,650,433 B1* | 11/2003 | Keane et al. | 358/1.15 |
| 6,757,086 B1* | 6/2004 | Mori et al. | 359/25 |
| 6,816,271 B1* | 11/2004 | Takahashi | 358/1.13 |
| 6,862,583 B1* | 3/2005 | Mazzagatte et al. | 705/64 |
| 6,874,034 B1* | 3/2005 | Hertling | 709/245 |
| 6,978,299 B1* | 12/2005 | Lodwick | 709/223 |
| 7,102,796 B2 | 9/2006 | Frederiksen | |
| 2001/0007130 A1* | 7/2001 | Takaragi | 713/186 |
| 2001/0014237 A1 | 8/2001 | Shima | 400/61 |
| 2001/0022668 A1 | 9/2001 | Gassho et al. | 358/1.15 |
| 2001/0029531 A1 | 10/2001 | Ohta | |
| 2001/0038462 A1 | 11/2001 | Teeuwen et al. | 358/1.15 |
| 2001/0055988 A1 | 12/2001 | Blake et al. | 455/575 |
| 2002/0002034 A1 | 1/2002 | Davies et al. | 455/41 |
| 2002/0018234 A1 | 2/2002 | Fu | |
| 2002/0032746 A1* | 3/2002 | Lazaridis | 709/217 |
| 2002/0042882 A1 | 4/2002 | Cervan | |
| 2002/0078160 A1 | 6/2002 | Kemp et al. | |
| 2002/0085224 A1* | 7/2002 | Price et al. | 358/1.13 |
| 2002/0085228 A1* | 7/2002 | Yagita | 358/1.15 |
| 2002/0108108 A1* | 8/2002 | Akaiwa et al. | 725/30 |
| 2002/0141801 A1* | 10/2002 | Shimoda et al. | 400/76 |
| 2003/0137689 A1* | 7/2003 | Bontempi | 358/1.15 |

FOREIGN PATENT DOCUMENTS

| | | |
|---|---|---|
| EP | 0996055 | 4/2000 |
| EP | 1 100 003 | 10/2000 |
| EP | 1 128 256 | 12/2000 |
| EP | 1091275 | 4/2001 |
| JP | 10-21021 A | 1/1998 |
| JP | H1021021 | 1/1998 |
| JP | 10-254662 A | 9/1998 |
| JP | H10254662 | 9/1998 |
| JP | 2000311072 A | 11/2000 |
| JP | 2001-92765 A | 4/2001 |
| JP | 2001-188664 A | 7/2001 |
| JP | 2001236183 A | 8/2001 |
| JP | 2001287422 A | 10/2001 |
| JP | 2001-325182 A | 11/2001 |
| JP | 2002032205 A | 1/2002 |
| WO | WO 97/32251 | 9/1997 |
| WO | WO 00/58822 | 10/2000 |

OTHER PUBLICATIONS

Microsoft, Windows 95 Printing and Fonts: The Basics, http://www.microsoft.com/technet/archive/win95/rk23_prt.mspx (pp. 3-4) No Date Provided.*

A Web-Based Nomadic Computing System, available as a PDF download on website: www.hpl.hp.com/techreports/2000/HPL-2000-110 (14 pages), Tim Kinberg, John Barton, Aug. 24, 2000.

Semantic Location. On website: http://cooltown.hp.com/dev/wpapers/semantic/semantic.asp (4 pages), Salil Pradhan, Apr. 17, 2002.

Cooltown Beacons. On website: http://cooltown.hp.com/beacon_full.htm (2 pages), Jan. 16, 2002.

People, Places, Things: Web Presence for the Real World. On website: http://cooltown.com/dev/wpapers/jbartonppt.pdf (15 pages), Tim Kindberg, John Barton, Jeff Morgan, Gene Becker, Debbie Casswell, Phillippe Debaty, Gita Gopal, Marcos Frid, Venky Krishnan, Howard Morris, Apr. 16, 2002.

Ubiquitous and contextual identifier resolution for the real-world wide web. On website: http://www.champignon.net/TimKindberg/IDResolution.pdf (13 pages), Tim Kindberg.

Communication pursuant to Article 94(3) EPC, issued in connection with EP application No. 03724094.2, mailed Nov. 26, 2008, 5 pages.

Decision to refuse a European Patent application, issued in connection with EP application No. 03724094,2, dated Jul. 19, 2011.

English translation of Final Decision for Rejection of the Japan Patent Office issued in connection with Japanese Patent Application No. 2003-586,738, issued Sep. 29, 2009.

English translation of Interrogatory of the Japan Patent Office issued in connection with Japanese Patent Application No. 2003-586,738, issued Apr. 19, 2011.

English translation of Notification of Reason for Rejection of the Japan Patent Office issued in connection with Japanese Patent Application No. 2003-586,738, issued Jan. 20, 2009.

International Preliminary Examination Report issued in connection with International Patent Application No. PCT/US03/12036, dated May 7, 2010.

International Search Report issued in connection with International Patent Application No, PCT/US03/12036, dated Nov. 2, 2005.

Provision of the minutes in accordance with Rule 124(4) EPC, issued in connection with EP application No. 03724094.2, dated Jul. 19, 2011.

Steven Pittsley, "Plug and Play in Windows 2000," May 17, 2001, <http://www.techrepublic.com/article/plug-and-play-in-windows-2000/>.

Summons to attend oral proceedings pursuant to Rule 115(1) EPC, received in EP application No. 03724094.2, mailed on Mar. 3, 2011, 13 pages.

USPTO, Final Office Action issued in connection with U.S. Appl. No. 13/163,164, dated Dec. 7, 2012.

USPTO, Non-Final Office Action issued in connection with U.S. Appl. No. 13/163,164, dated Aug. 18, 2011.

USPTO, Non-Final Office Action issued in connection with U.S. Appl. No. 13/163,164, dated Aug. 27, 2012.

USPTO, Non-Final Office Action issued in connection with U.S. Appl. No. 13/163,164, dated Feb. 27, 2012.

USPTO, Notice of Allowance and Fees Due issued in connection with U.S. Appl. No. 13/163,164, dated Jun. 14, 2013.

Written Opinion issued in connection with International Patent Application No. PCT/US03/12036, dated Jun. 10, 2009.

* cited by examiner

PULL BASED COMPUTER OUTPUT DEVICES

FIELD OF THE INVENTION

The present invention relates generally to a computer output system, and more particularly to a computer output system employing multiple output devices.

BACKGROUND OF THE INVENTION

A common type of computer system output is a paper printout. The printing may be of text, graphics, data, etc. A printout may be needed for many reasons, including creating documentation and for sharing information between persons, for example.

An increasingly common printing system is an institutional setting wherein a computer system includes multiple computers and multiple printers. The computers and printers may be interconnected by one or more computer networks. A user may access the printers using the network. A network printing system is advantageous in that users can access multiple printers.

The printing system may extend over multiple rooms, multiple locations, multiple buildings and even multiple geographic locations. Such a printing system may be composed of different types and brands of devices that have been incorporated into a computer system at varying times. The result is a non-homogeneous network wherein addition of a new device may take appreciable time to integrate and configure. This is especially true when the computer system employs multiple printers.

However, there are drawbacks to the prior art approach. In the prior art, a user may access a particular printer if the user knows the printer, knows its characteristics and knows its address within the network. A user must send data to a known address in order to print. In addition, the user must know the characteristics of the printer or printers and must have an appropriate driver or driver selected beforehand. The user cannot send out a print job without knowing something about the printing system. The user cannot rely on the printing system to handle the print job in an appropriate or most efficient way, and cannot rely on the printing system to handle printer changes, additions or deletions. As a result, the task of printing may be made difficult when a printer or printers within the computer environment are added, deleted, replaced, moved or upgraded.

In the prior art, the job submission client must install a driver for every printer to be used. This driver is responsible for rendering a job from a client-format (such as Microsoft Graphics Device Interchange (GDI) format) into a device-specific format (such as Printer Control Language (PCL)-5c). This is especially troublesome for clients such as portable electronic devices that possess limited memory or limited processing resources. Often a driver is customized for a particular model number or configuration of a printer, meaning that changes to a printer require changes to the driver. Adding or changing a printer in the prior art therefore requires all job submission clients to be updated. This is complicated and time-consuming, even with only a relatively small number of job submission clients.

There are other problems with the prior art approach. In prior art printing, the user explicitly sends a print job to a particular printer, i.e., pushes the print job to a pre-designated printer. Therefore, in such push-based printing, if the user prints a document and the printer is jammed or disabled, the user cannot obtain the resulting printout at the next nearest printer unless the user manually reprints the job (i.e., pushes the print job to another printer, creating another print operation). Similarly, if the user prints a document and the printer is out of toner, a poor print is produced and the prior art printing system does not forward the job to a printer with available toner. Likewise, if the user prints a document and the printer is out of paper, the printer is blocked while waiting for the paper to be filled and the prior art printing system does not forward the job to a printer with available paper. Moreover, if the user wants to print a small document and the printer is busy, the user may have to wait until the current document is printed. The printing system does not forward the job to an available printer.

Therefore, there remains a need in the art for improvements in printing.

SUMMARY OF THE INVENTION

A presentation output system comprises a digital computer network, one or more job submission clients, and a job store. The job store accepts and holds output jobs from the plurality of job submission clients. The presentation output system further comprises one or more presentation output devices that pull the output jobs from the job store for outputting.

DETAILED DESCRIPTION

Figure 1:
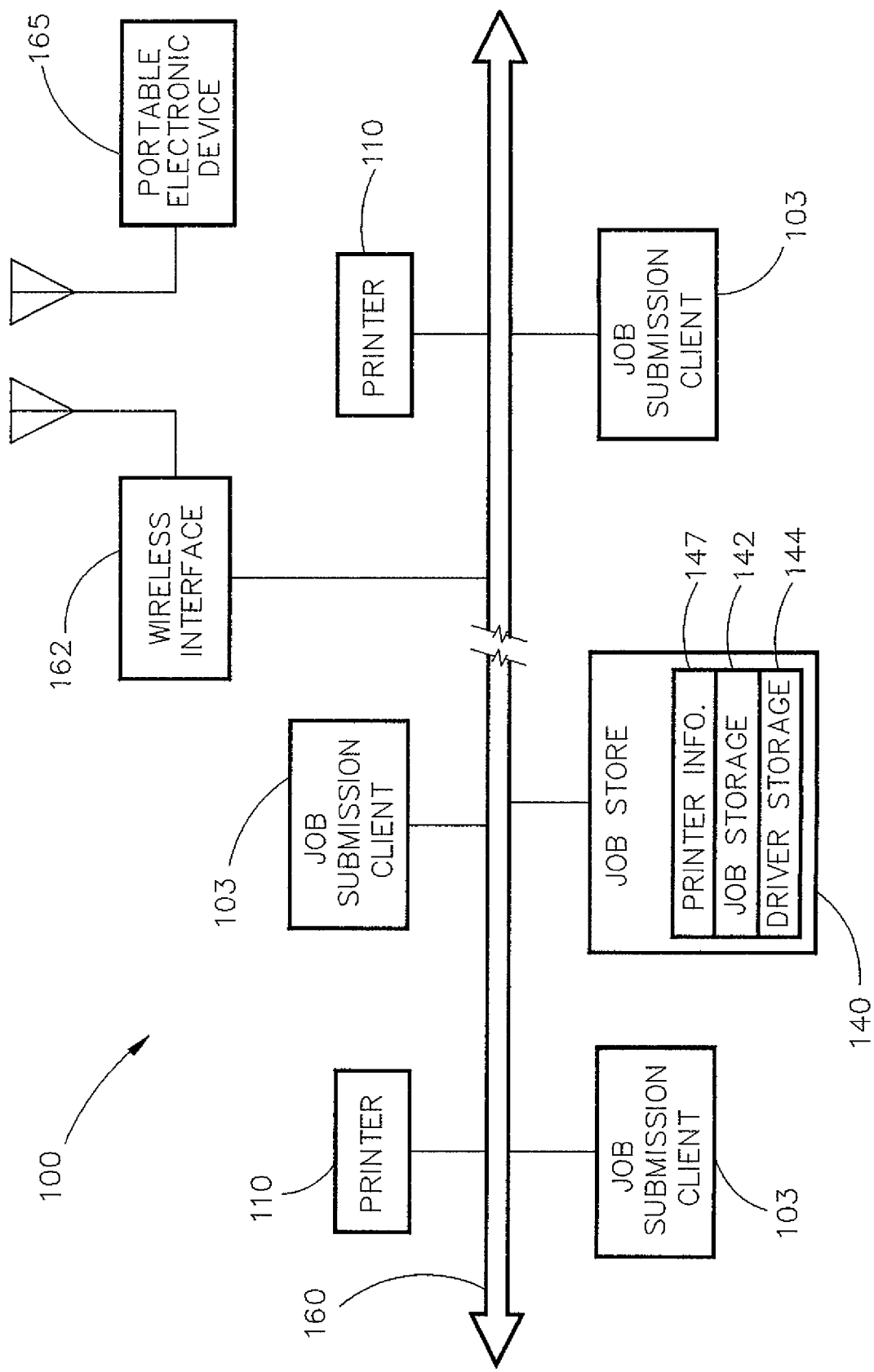
FIG. 1 is a schematic of a printing system according to one embodiment of the invention.

FIG. 1 is a schematic of a printing system 100 according to one embodiment of the invention. The printing system 100 may include a digital computer network 160, one or more computer output devices, such as one or more printers 110, and one or more job submission clients 103. In addition, the printing system 100 includes a job store 140 and may optionally include a wireless interface 162.

Another type of computer system output is a display of a document, graphic, picture, etc., using some manner of a presentation output device. The presentation output device may be a projector, an electronic paper device, a three-dimensional printer (such as for creating solid three-dimensional prototype models from a CAD type digital file), a hologram generator device, etc. For purposes of discussion, these devices may be referred to as presentation output devices. Therefore, the user of such output devices may generate a display job and provide the display job to a repository. For purposes of the discussion the term display is used as the output of a presentation output device and display job is used as the term for a job submission to the presentation output system. An available or designated presentation device may then pull and display the display output. Such a system reduces or eliminates the problem of maintaining multiple formats of data presentation. Alternatively, the invention enables an output device to decide whether the output device can display the data.

The use of the term printing in this document is used interchangeably with the term displaying, and the term printer is used interchangeable with presentation device. The discussion below generally focuses on printing, since it is the most common deployment scenario. However, the benefits and advantages of pull-based printing may be applied to other types of computer-generated presentation output, and thus the discussion is applicable to all such output devices. This also includes systems where the output devices are all printers, are all presentation devices, or conversely are a mixture of printers and presentation devices.

The network 160 of the printing system 100 may be any type of digital computer network, including a local area network (LAN), a wide-area network (WAN), a virtual private network (VPN), the Internet, etc. The network 160 allows multiple computer devices to communicate over a wire, cable or optical fiber. Alternatively, the network 160 may be a wireless network, wherein the various components communicate wirelessly, such as through radio frequency (RF) communications or infrared (IR) communications, for example.

The one or more job submission clients 103 may be any type of computerized devices, including personal computers (PCs), laptops, work stations, cell phones, PDAs, etc. The one or more job submission clients 103 communicate over the network 160 and may generate print jobs or other types of output, such as display jobs.

The job store 140 receives and holds submitted output jobs. An output job may be a display job to be displayed using any manner of computer output device or may be a print job to be printed. For clarity, the discussion will focus on print jobs and printing operations. The job store 140 may also function as a spooler and may spool print jobs to a printer 110. The job store 140 may include a print driver storage 144, a job storage 142, and a printer information storage 147. The job storage 142 may store one or more print jobs waiting to be printed.

In one embodiment, the user may be inside a firewall while the job store 140 may reside outside the firewall. This enables printing of a print job even if the user and the printer are across one or more firewalls. In addition, job stores may be chained, so that the printer may be connected to a first job store and the user may be connected to a second job store. The two job stores may communicate and therefore may present a single view of the job store to both the user and the printer.

In one embodiment, the job store 140 receives a print job submission from a job submission client, receives a pull command from a printer, and provides the print job to the printer in response to the pull command. Alternatively, the job store 140 may receive any manner of output job, such as a display job, and provide the output job to a pulling computer output device. For example, a computer output device 110 may issue a pull command to the job store 140, pull a display job from the job store 140, and display the display job using a presentation output device formed in the computer output device 110.

The printer driver storage 144 stores printer drivers corresponding to printers in the printing system 100. The printer driver storage 144 allows a new printer driver to be added to the job store 140 when a new printer is connected to the network 160, thereby simplifying such an addition. Consequently, job submission clients 103 may interact only with the job store 140, and therefore may be unaffected by any printer changes.

The printer information storage 147 may store information about printers in the printing system 100, such as printer addresses, printer names, printer capacities, printer locations, etc.

Figure 2:
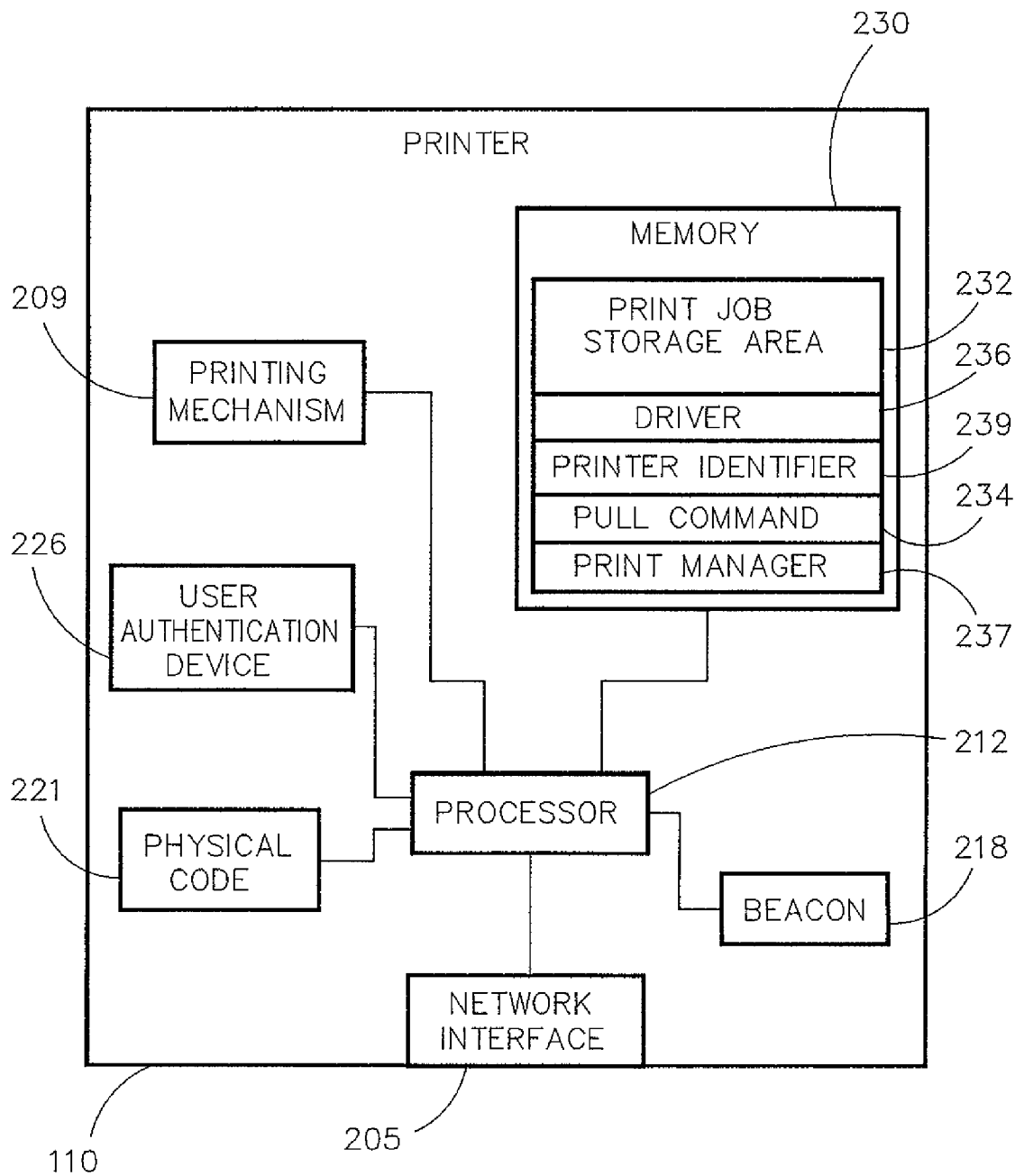
FIG. 2 shows a detail of a printer according to another embodiment of the invention.

In operation, one or more printers 110 may communicate over the network 160 (printer details are shown in FIG. 2). The job store 140 may receive a print job pull command, retrieve an appropriate printer driver from the printer driver storage 144, apply the printer driver to the print job, and supply the print job from the job storage 142 to the pulling printer.

A printer 110 may issue a pull command when it is ready to print, i.e., when it is idle or when it is nearly finished with a current print job. A printer 110 is capable of pulling a print job from the job store 140 and printing the print job. The job store 140 may allow a printer 110 to pull print jobs and may additionally push print jobs to the printer 110. The job submission client 103 does not need to know the name of the printer, its address, or its location. Therefore, any printer configuration changes are simplified. The printing system 100 automatically and autonomously selects and uses a printer based on printer availability, but without having a printer overseer that must constantly monitor all printers.

In the pull-based printing system according to the invention, drivers for multiple printers may be partitioned into two drivers, a job store driver and a production driver. The job store driver is used to convert a client's print or output job into a printer-neutral format. The production driver may convert the printer-neutral print job into a format for a specific printer. The job store driver is a driver used to submit a print job to the job store 140, and is not a driver for any particular printer. Consequently, for print operations (or any type of relevant output), each job submission client 103 may be configured with just the job store driver. Thus, if the user wants to print, the print job may be submitted to the job store 140 using the job store driver. The print jobs submitted to the job store driver may be converted to a printer independent format, such as a PDF or XHTML format, for example.

The job store driver may present a user interface that enables the user to specify a finishing intent of the print job. For example, the user may specify double-sided printing, collating of the print job, stapling of the print job, etc. The job store driver passes these finishing intent specifications to the production driver, upon occurrence of the pull command, in order to perform the finishing of the print job by the printer.

The job store driver may include an optional interface that allows a user to specify the name of a particular printer. In this embodiment, the user can opt to fill in the name of the printer, leave it blank, or put in "nearest printer", for example. These options result in different operations, and enable the job store driver to co-exist with other drivers. Therefore, a user who does not want to use the advanced features of the job store 140 and the job store driver can continue using a prior art push approach. This is important, as the printing system 100 according to the invention therefore does not need a new deployment model other than the presence of the job store driver, the job store hardware/software (which could be implemented on network printer server, such as an HP Print server appliance 4200, HP Part No. J41 17A from Hewlett-Packard Company) and some changes in the printer. In one embodiment, the printer changes may be implemented as an add-on co-processor to an external input/output (EIO) slot or a peripheral component interconnect (PCI) slot, for example. This allows pull-based printing (or other forms of pull-based output) to be deployed in stages to an existing system.

FIG. 2 shows a detail of a printer 110 according to another embodiment of the invention. The printer 110 may include a network interface 205, a printing mechanism 209, a processor 212, a beacon 218, a physical code 221, a user authentication device 226, and a memory 230.

The network interface 205 may be any manner of interface, such as a network card, a modem, etc. The network interface 205 enables communication over the network 160.

The printing mechanism 209 may be any type of printing mechanism capable of providing a paper printout. The printing mechanism 209 may be a laser printing mechanism, a bubble jet printing mechanism, or an ink jet printing mechanism, for example.

The processor 212 may be any type of general processor. The processor 212 executes a control routine contained in the memory 230. In addition, the processor 212 receives inputs and controls operation of the printer 110.

The memory 230 may be any type of digital memory. The memory 230 may include, for example, a print job storage area 232, a pull command 234, a print manager 237, and a printer identifier storage 239. In addition, the memory 230 may store a printer control routine that conducts printing operations, etc. Furthermore, the memory 230 may store a driver 236 for the printer 110.

The print job storage 232 temporarily stores one or more pending print jobs that have been pulled from the job store 140. The print jobs may be jobs to be pushed to one or more printers or jobs to be pulled by one or more printers.

The pull command 234 is a command or set of commands that pull print jobs from the job store 140. The pull command 234 may be a generic command that simply pulls a waiting print job. Alternatively, the pull command 234 may include information fields, such as a user name or a job submission client identifier if the user performs an authentication process.

In another alternative, the pull command 234 may include a printer identifier that specifies the printer that is pulling the print job. The printer identifier may be automatically inserted into the pull command 234 by the printer 110, or may be inserted as part of an authentication operation.

The print manager routine 237 monitors the status of the printer 110, determines when to pull a print job from the job store 140, and uses the pull command 234 to issue a pull command to the job store 140. The print manager routine 237 also receives a print job, temporarily stores it in the print job storage 232, and provides it to the printing mechanism 209.

The printer 110 may specify the printer type in the pull command so that the job store 140 may apply an appropriate printer driver to a print job. Alternatively, the printer 110 may apply an appropriate locally stored printer driver after it pulls a print job from the job store 140.

The printer identifier storage 239 may store printer identification information. The job store 140 may use this printer identification information to push a print job to a specific printer or to associate a print job with a specific printer. The job store 140 may receive a new printer identifier information when a new printer is added to the printing system 100. For example, the printer 110 may automatically inform the job store 140 when the printer 110 is added to the printing system 100. This may include sending the printer identification information that is stored in the printer identifier storage 239.

The beacon 218 is an optional component that broadcasts printer information, including a printer identifier, for example. The broadcast may be a wireless broadcast, such as an RF or IR communication. The printer information may include a network address of the printer and may include a printer type information. This may enable the job store 140 to determine an appropriate printer driver, if needed. The beacon 218 may be used by any manner of portable electronic device 165 such as a laptop computer, cell phone, PDA, etc., in order to send a print job to a printer 110.

The physical code 221 is an optional component that may be a bar code or other physical code displayed on the exterior of the printer 110. The physical code 221 may be read using a device such as an optical reader or scanner that is connected to or included as part of the portable electronic device 165. The physical code 221 may include the printer information, such as the printer address, the printer location, the printer characteristics, etc.

The user authentication device 226 is an optional component that receives a user input, verifies whether the user is authorized to print at the particular printer, and enables the printer 110 for printing if the user is successfully verified. The user authentication device 226 may be, for example, a fingerprint reader, a keypad for input of an identifier code of a user, a secure ID card or badge reader, or any other manner of biometric information reader device. The user authentication device 226 may prompt the printer 110 to pull a print job or jobs for the authenticated user.

Figure 3:
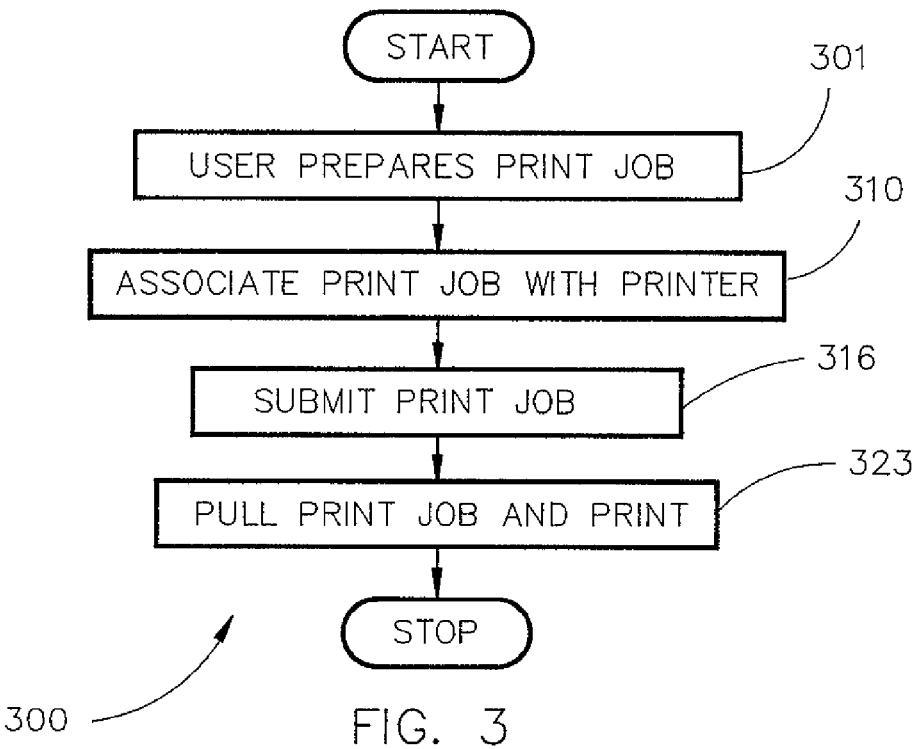
FIG. 3 is a flowchart of a printing method according to another embodiment of the invention.

FIG. 3 is a flowchart 300 of a printing method according to another embodiment of the invention. In step 301, the user prepares a print job in the job submission client 103. This may include creating, modifying, or recalling a digital data file, for example.

In step 310, the user may associate the print job with a particular printer. This may be done by specifying the printer name, address, physical location, etc. Alternatively, this may be done by choosing an appropriate printer driver available in the job submission client 103. An association is optional.

In step 316, the user submits the print job to the job store 140.

In step 323, a printer pulls a print job from the job store 140. For example, an available printer may send a pull command 234 to the job store 140. Alternatively, if the user has associated the print job with a particular printer, then the print job may be pushed to the printer, or alternatively only the designated printer may be allowed to pull the print job.

In this manner, the printing system 100 may perform pull-based printing, push-based printing, or both. Pull-based printing according to the invention therefore may be integrated into a traditional push-based printing system, or may retain push-based printing functionality for users who desire such functionality.

Figure 4:
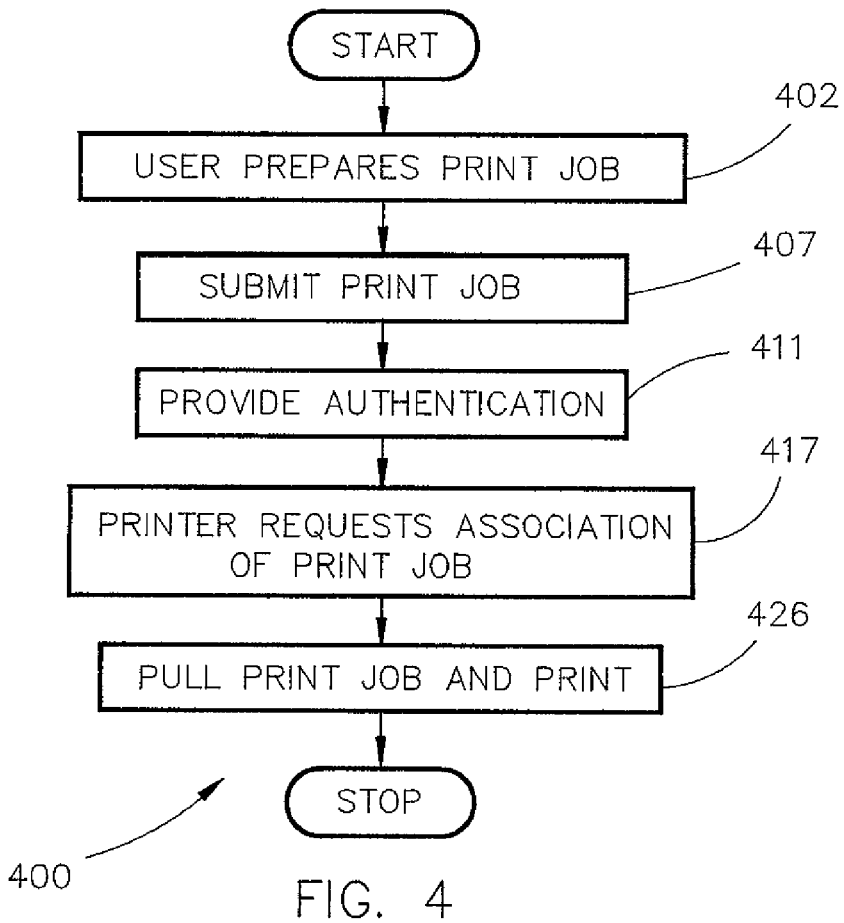
FIG. 4 is a flowchart of a printing method according to yet another embodiment of the invention.

FIG. 4 is a flowchart 400 of a printing method according to yet another embodiment of the invention. In step 402, the user prepares a print job in the job submission client 103, as previously discussed.

In step 407, the print job is submitted to the job store 140, as previously described.

In step 411, the user provides a user authentication information at the particular printer 110. The user authentication information may be a fingerprint reading, may be entry of an identifier code, may be a scan of an ID badge or ID card, or may be any other manner of biometric information.

The user authentication information may be submitted in a suitable encrypted form and may be stored in the job store 140 along with the submitted print job. This may be done by the user prior to job submission if the user has a password protected account in the job store 140. Therefore, any job that the user submits to the job store 140 may include the appropriate authentication information. As a result, when the user wants to print, the print job is submitted to the printer and the information is compared with the information in the job store 140 before allowing the printer to pull the print job. Presenting the user authentication at the printer may also act as a trigger for the pull command.

In addition, in one embodiment, the document produced by the job store driver is encrypted and remains encrypted until decrypted by the printer or output device. In this embodiment, the production driver does not need to understand the content of the store job in order to pass it on to the printer or output device.

In step 417, the particular printer 110 may request the association of a print job (from the authenticated user) to the printer 110. In response, the job store 140 creates the association.

In step 426, a printer pulls the authenticated print job and prints it. The print job therefore may be printed in response to the user authentication information input. The print job may be pulled from the job store 140 by the authenticated printer 110 and printed. Alternatively, if the user has associated the print job with a particular printer, then the print job may be pushed to the authenticating printer, or only the authenticating printer may be allowed to pull the print job.

Figure 5:
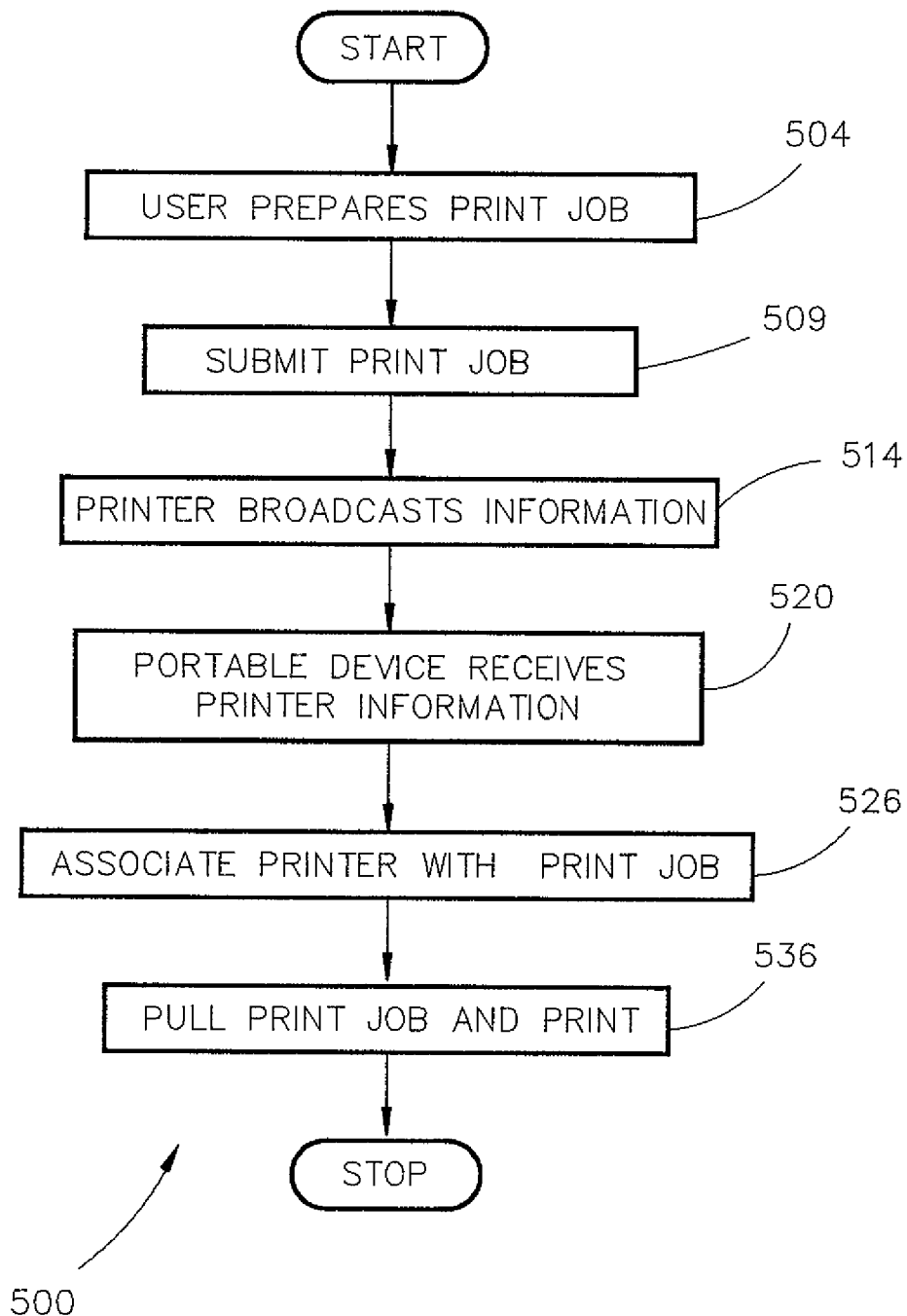
FIG. 5 is a flowchart of a printing method according to yet another embodiment of the invention.

FIG. 5 is a flowchart 500 of a printing method according to yet another embodiment of the invention. In step 504, the user prepares a print job in the job submission client 103, as previously discussed.

In step 509, the print job is submitted to the job store 140, as previously described.

In step 514, a printer 110 broadcasts printer information. The broadcast may occur at any time, and may be substantially continuous. A user can use the printer information to form an association of the print job to the printer 110. This may be desirable if the job submission client 103 comprises a portable electronic device 165. In this situation, the user may want to print to a printer located nearby. Therefore, in order to facilitate printing, it is desirable that such a portable electronic device 165 be able to send a print job to a specific printer. This enables a mobile, temporary, or guest user of the printing system 100 to print without having to go through a complex and time-consuming process of configuring the portable electronic device 165, sending the print job to a printer, and then finding the printing printer.

In one embodiment, a wireless beacon 218 broadcasts printer information (see FIG. 2 and accompanying discussion). In another embodiment, the broadcast may comprise a physical code 221 displayed on an exterior of the printer. The physical code 221 may be electronically readable by a portable electronic device 165, such as by a scanner communicating with the portable electronic device 165.

In step 520, the portable electronic device 165 receives the printer information. This may include receiving and decoding a wireless broadcast from the beacon 218, optically/electronically scanning a bar code or other code on the printer 110, etc. Alternatively, if the printer information is included in the physical code 221, the code may be entered into the portable electronic device 165 by the user.

In step 526, the portable electronic device 165 associates the printer information with the submitted print job. In one embodiment, the portable electronic device 165 may be used as a remote control device for the printing system 100. The portable electronic device 165 may communicate with both the job store 140 (such as through a wireless LAN, for example), and the printer 110 (such as through a beacon 218, for example) in order to associate the print job with the printer 110. In this mode, the print job does not originate from the portable electronic device 165, but instead originates from a job submission client 103 of the network 106. The portable electronic device 165 just acts as a remote control mechanism that is capable of performing a job association and triggering a pull command from a printer.

Alternatively, the portable electronic device 165 may act as a job submission client. The portable electronic device 165 may create a print job and send the print job to the job store 140 (similar to any other job submission client 103). The portable electronic device 165 thus does not need to store any drivers required by the printers of the printing system 100.

In step 536, a particular printer 110 pulls and prints the print job. Furthermore, the particular printer 110 may pull any print job that includes a corresponding printer information. Therefore, the printer 110 may issue two types of pull commands. One type of pull command may include information regarding a specific print job the printer 110 wants to pull. This information may be obtained from a user ID associated with a print job, thus printing the job of the user. The second type of pull command requests any print jobs associated with the particular printer, Le., pulling any print job that specifies the pulling printer. If no response is received, the printer 110 may then issue a generic, non-specific pull command. The print job therefore may be printed in response to the receipt of the printer information.

Figure 6:
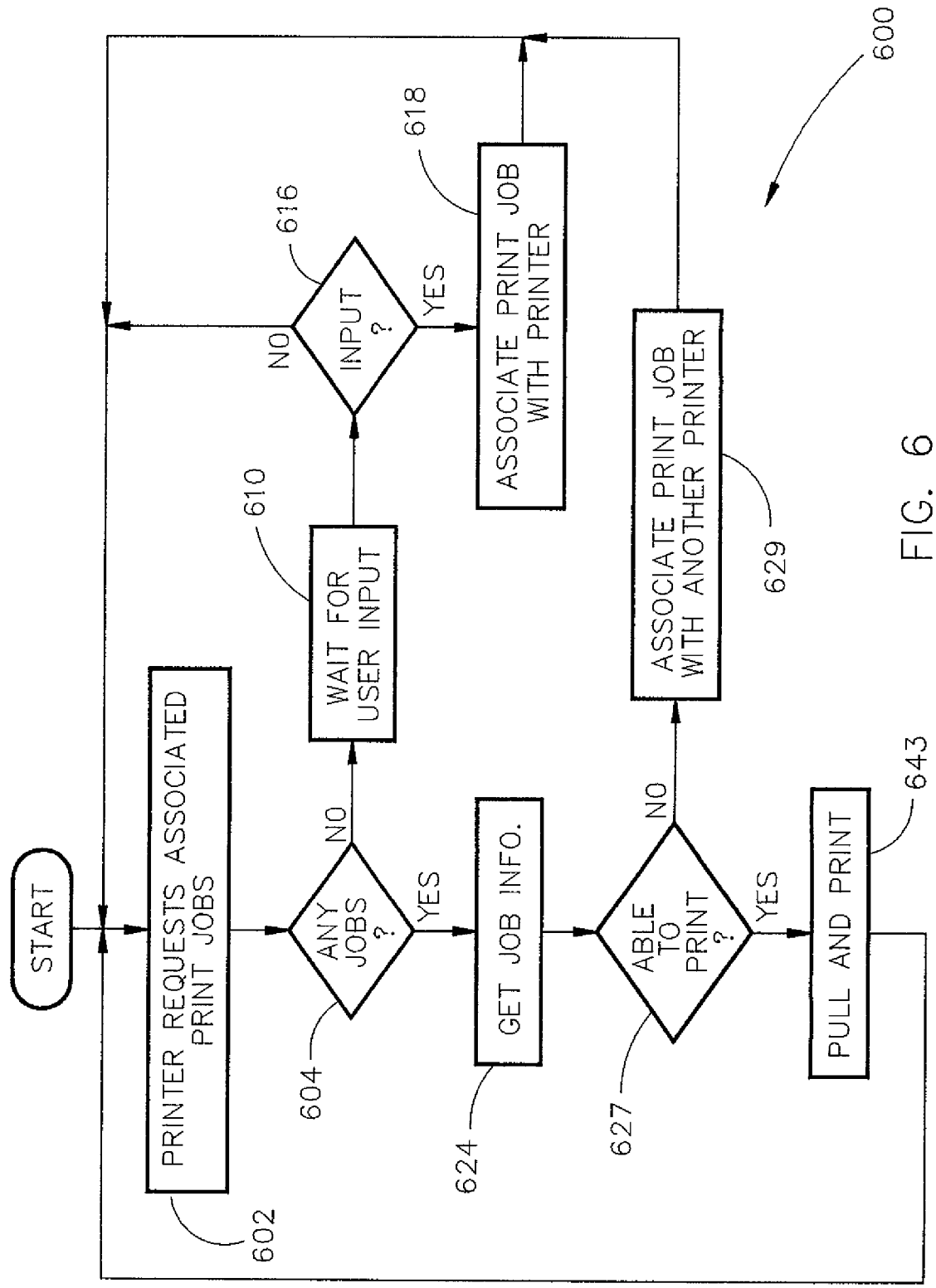
FIG. 6 is a flowchart of a printer operation method according to yet another embodiment of the invention.

FIG. 6 is a flowchart 600 of a printer operation method according to yet another embodiment of the invention. This flowchart reflects one printer operation embodiment in the printing system 100. In step 602, the printer 110 requests associated print jobs from the job store 140. For example, the printer 110 may request any print jobs authenticated at the printer 110, or may request print jobs identified and associated through a beacon 218 or physical code 221. The physical code 221 and beacon 218 may be used by the portable electronic device 165 to associate the print job with the printer 110. This mechanism allows a printer 110 to advertise its name, address, location, etc., to the portable electronic device 165.

In step 604, if there are any print jobs, the method proceeds to step 624; otherwise it branches to step 610.

In step 610, the method waits a predetermined wait time for user input and then proceeds to step 616.

In step 616, if an input (i.e., a print job) has been received, the method proceeds to step 618; otherwise it branches back to step 602.

In step 618, the print job is associated with the printer 110 and the method branches back to step 602.

In step 624, the printer obtains job information from the job store 140. The job information may include a job size, a job priority, etc.

In step 627, the printer 110 determines whether it is able to print. For example, the printer may check a toner level, a paper level, an idle status, etc. If the printer is able to print, it proceeds to step 643; otherwise it branches to step 629.

In step 629, the printer sends a decline message to the job store 140 that informs the job store 140 that the printer declines (i.e., is unable to perform) the print job. As a result, the job store 140 associates the print job with another printer. In this manner, the printing system 100 may automatically manage the print jobs to be printed, and may re-route print jobs based on printer availability. Consequently, the user may not have to investigate and reprint a print job if there is a problem.

In step 643, the printer 110 pulls the print job from the job store 140 and prints it. The method then loops back to 602 and waits for another print occurrence.

Figure 7:
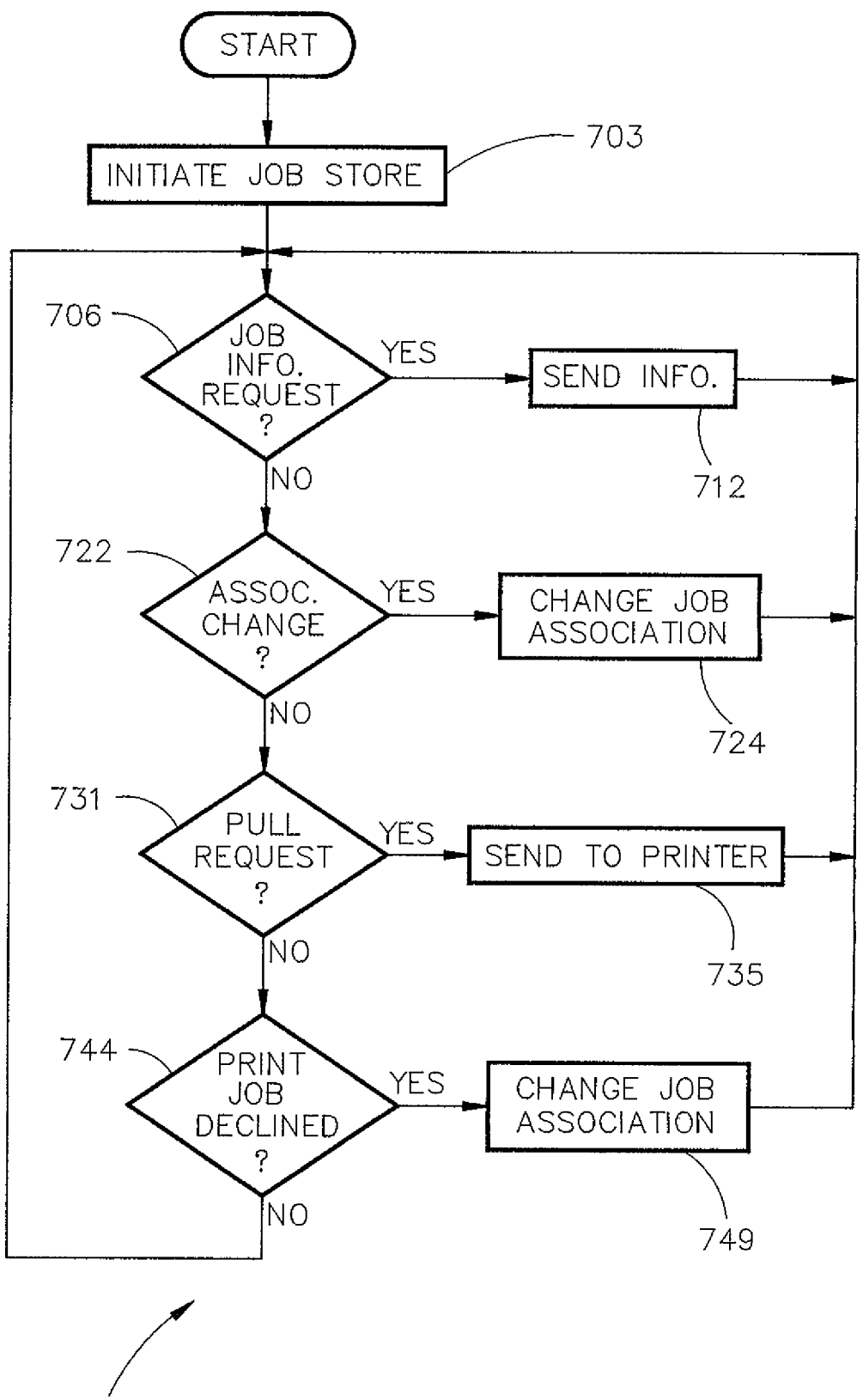
FIG. 7 is a flowchart of a job store operation according to yet another embodiment of the invention.

FIG. 7 is a flowchart 700 of a job store operation according to yet another embodiment of the invention. In step 703, the job store is initiated, such as through initiation of the printing system 100, etc. This is typically done only at start-up. The job store 140 at startup may perform any necessary housekeeping duties, including initializing a table of available printers in the printing system 100. Therefore, when a new printer 110 is added to the printing system 100, the printer information of the new printer is added to this table and the job store 140 is automatically informed of the new printer being added. Consequently, an addition of a new printer 110 only requires a configuration change in the job store 140, instead of requiring a reconfiguration at every job submission client 103.

In step 706, the job store 140 determines whether a job information request has been received. If it has, the method branches to step 712; otherwise the method proceeds to step 722.

In step 712, the requested job information is sent to the requesting printer. The job information may be retrieved from the printer information storage 147 of the job store 140, for example. The request scenario may include a printer 110 inquiring whether there are any print jobs associated with that printer 110. In this manner, a printer 110 may pull and print jobs that have been associated with a particular printer. The method then branches back to step 706.

In step 722, the job store 140 determines whether a job association change has been requested. This may occur, for example, if a user decides to re-route the print job to a different printer. Alternatively, this may occur if the user has performed some printer specification after submitting a print job, such as providing a user authentication input, receiving printer information from a beacon, etc. In this manner, the user may select and configure a submitted print job in order to control the printing process. If an association change has been received, the method branches to step 724; otherwise it proceeds to step 731.

In step 724, the job store 140 changes the job association for the corresponding print job and branches back to step 706. The job association may control which printer pulls the print job or which printer receives the pushed print job.

In step 731, the job store 140 determines whether a pull request has been received from a printer 110. If a pull request has been received, the method branches to step 735; otherwise it proceeds to step 744.

In step 735, in response to a pull request from a printer 110, the job store 140 sends the requested print job to the requesting printer 110. The method then branches back to step 706.

In step 744, the job store 140 determines whether a print job has been declined. The declined print job may be a pushed print job or a pulled print job. A print job may be declined for various reasons, such as for example, the particular printer being out of paper, out of toner, or busy. If the print job has been declined, the method branches to step 749; otherwise the method loops back to step 706.

In step 749, the job association for the declined print job is changed. For example, if the original printer is unable to print for any reason, the job store 140 may change the job association to either push the print job to another printer or allow another printer to pull the print job.

The printing system 100 according to the invention may be applied to any computer system that includes multiple printers. It may also include any system wherein user authentication is required for printing. Furthermore, it may apply to any system where user may want to print from a portable electronic device 165, but yet without difficult set-up or configuration. The system may include a portable electronic device 165 that acts as a job submission client 103. All output jobs may be routed through the job store 140, as the job store 140 may include any necessary drivers for printers (or other output devices) and may use an internal job store driver to perform a job transformation in one location, instead of at different job submission clients 103.

The invention differs from the prior art in that in the prior art a printer does not pull a print job. Moreover, in the prior art a printer does not broadcast printer information. In addition, in the prior art a presentation output device does not pull output jobs. Furthermore, in the prior art a portable electronic device cannot receive printer information broadcast from a printer, enabling the user to print without having to manually configure the portable electronic device.

The invention further differs from the prior art in that the prior art requires an update of all relevant job submission clients 103 when a new printer is added to a prior art printing system. The prior art also requires knowledge of printer characteristics upon job submission. The prior art does not allow dynamic rerouting of print jobs if a chosen printer is malfunctioning.

The prior art is not capable of using a portable electronic device as a remote control mechanism and does not allow printers to broadcast information to proximity located devices. The prior art does not let a portable electronic device print without installing a driver for at least one of the printers in the prior art printing system.

Pull-based printing according to the invention provides several benefits. The user does not need to know a printer's name, address, or characteristics, i.e., what driver to use, for example. The user does not need to worry about changes to the printing system 100. The printing system 100 reacts appropriately and automatically to a print job. The printing system 100 can provide a pull-based printing capability along with a user authentication capability. Moreover, the printing system 100 according to the invention can provide a pull-based printing capability for mobile devices. The pull printing capability enables the printer to perform the jobs it can print and reroute print jobs that cannot be successfully performed. In addition, the printing system 100 and the components thereof may also perform a traditional push-based printing.

We claim:

1. A presentation output system for a digital computer network; with one or more job submission clients communicating over said digital computer network; the presentation output system comprising one or more presentation output devices, each of said one or more presentation output devices being configured to track when it is one of idle and nearly finished with a current output job, wherein each of said one or more presentation output devices automatically communicates over said digital network and pulls an output job from a job store for outputting when that presentation output device determines that it is one of idle and nearly finished without receiving input from a user of the one or more job submission clients; and wherein one or more presentation output devices are programmed to receive output jobs with the job store converting the output jobs from a neutral presentation output device format to a format suitable for use by the one or more presentation output devices pulling the output jobs from the job store.

2. The presentation output system of claim 1, wherein a new presentation output device added to said output system automatically informs said job store that said new presentation device is being added.

3. The presentation output system of claim l, wherein said output job is encrypted by a job submission client and is decrypted by a receiving presentation output device.

4. The presentation output system of claim 1, with a presentation output device of said one or more presentation output devices comprising:

a processor;

a network interface communicating with said processor and capable of communicating over said digital computer network;

a presentation output device communicating with said processor; and a memory communicating with said processor and including a display job storage area for storing one or more pending display jobs and a pull command;

wherein said processor uses said pull command to issue a display job pull command through said network interface, receive a display job in response, and display said display job using said presentation output device.

5. The presentation output system of claim 1, wherein a presentation output device of said one or more presentation output devices comprises a projector.

6. The presentation output system of claim 1, wherein a presentation output device of said one or more presentation output devices comprises a three-dimensional printer.

7. The presentation output system of claim 1, wherein a presentation output device of said one or more presentation output devices comprises an electronic paper device.

8. The presentation output system of claim 1, wherein a presentation output device of said one or more presentation output devices comprises a hologram generator device.

9. A printing system for a digital computer network; with one or more job submission clients communicating over said digital computer network; said system comprising:

one or more printers, each of said one or more printers being configured to track when it is one of idle and nearly finished with a current print job, wherein each of said one or more printer automatically communicates over said digital network and pulls a print job from a job store for printing in response to that printer determining that it is one of idle and nearly finished; and wherein said one or more printers are programmed to receive output jobs with the job store converting the print jobs from a printer-neutral format to a format suitable for use by the one or more printers pulling the print jobs from the job store.

10. The printing system of claim 9, wherein a new printer added to said printing system automatically informs said job store that said new printer is being added.

11. The printing system of claim 9, wherein said print job is encrypted by a job submission client and is decrypted by a receiving printer.

12. The printing system of claim 9, with a printer of said one or more job submission clients comprising:

a processor;

a network interface communicating with said processor and capable of communicating over said digital computer network;

a printing mechanism communicating with said processor; and a memory communicating with said processor and including a print job storage area for storing one or more pending print jobs, a pull command, and a print manager routine;

wherein said processor uses said print manager routine and said pull command to issue a print job pull command through said network interface, receive a print job in response, and print said print job using said printing mechanism.

13. The printing system of claim 12, wherein said processor uses said print manager routine to receive and print a pushed print job.

14. The printing system of claim 12, with said printer further comprising a user authentication device.

15. The printing system of claim 12, with said printer further comprising a fingerprint reader user authentication device.

16. The printing system of claim 12, with said printer further comprising a keypad user authentication device for inputting an identifier code.

17. The printing system of claim 12, with said printer further comprising an identification card or badge reader user authentication device.

18. The printing system of claim 12, with said printer further comprising a broadcast beacon that wirelessly broadcasts printer information.

19. The printing system of claim 12, with said printer further comprising a physical code displayed on an exterior of said printer and including printer information.

20. The printing system of claim 9, further comprising a wireless interface capable of relaying communications between said digital computer network and a portable electronic device.

21. A printer for a pull-based printing system, comprising:

a processor configured to track when the printer is one of idle and nearly finished with a current print job;

a network interface communicating with said processor and capable of communicating over a digital computer network;

a printing mechanism communicating with said processor; and a memory communicating with said. processor and including a print job storage area for storing one or more pending print jobs, a pull command, and a print manager routine;

wherein said processor uses said print manager routine and said pull command to automatically issue a print job pull command through said network interface to a job store that accepts and holds print jobs from a plurality of job submission clients, receive a print job from said job store in response, and print said print job using said printing mechanism, the processor issuing said print job pull command when said processor determines that the printer is one of idle or nearly finished with a current print job and without receiving input from a user of a job submission client that stored the print job in the job store, and wherein the job store initially stores the print jobs in a printer-neutral format when the job store receives the print jobs and converts the print jobs from the printer-neutral format to a format suitable for use by the printer.

22. The printer of claim 21, wherein said processor uses said print manager to receive and print a pushed print job.

23. The printer of claim 21, further comprising a user authentication device.

24. The printer of claim 21, further comprising a fingerprint reader user authentication device.

25. The printer of claim 21, further comprising a keypad user authentication device for inputting an identifier code.

26. The printer of claim 21, further comprising an identification card or badge reader user authentication device.

27. The printer of claim 21, further comprising a broadcast beacon that wirelessly broadcast printer information.

28. The printer of claim 21, further comprising a physical code displayed on an exterior of said printer and including printer information.

29. The printer of claim 21, wherein when said printer is added to a printing system said printer automatically informs said job store that said printer is being added.

30. A printing method, comprising the steps of:
one or more printers each monitoring itself to track when that printer is one of idle and nearly finished with a current print job;
in response to the printer being one of idle and nearly finished with a current print job, that printer automatically pulling said print job from a job store to the printer without receiving input from a user of a job submission client from which the print job was submitted to the job store;
receiving said print job from the job store, wherein the job store sends the print job to the printer in a format compatible with the printer; and
printing said print job in said printer.

31. The method of claim 30, further comprising the steps of:
broadcasting a printer information from said printer;
receiving said printer information in a portable electronic device; and
associating said printer information with said print job in said portable electronic device;
wherein the submitting comprises submitting said print job from said portable electronic device to said job store.

32. The method of claim 30, further comprising the step of associating said print job with said printer in response to a printer information included in said print job, and wherein said printer information is wirelessly broadcast by said printer and received in a portable electronic device.

33. The method of claim 30, further comprising the step of associating said print job with said printer in response to a printer information included in said print job, and where said printer information is displayed on an exterior of said printer and is entered into a portable electronic device by said user.

34. The method of claim 30, further comprising the step of associating said print job with said printer in response to printer information included in said print job, and wherein said printer information is displayed on an exterior of said printer and is scanned into a portable electronic device.

35. The method of claim 30, further comprising the step of authenticating said user corresponding to said print job, with the authenticating occurring before the pulling step.

36. The method of claim 30, further comprising the steps of:
providing user authentication information to said printer;
comparing said user authentication information to stored authentication information; and
pulling said print job from said job store o said printer and printing said print job if said user authentication information matches an authentication information in said stored authentication information.

37. The method of claim 30, further comprising the step of authenticating said user corresponding to said print job, with the authenticating comprising verifying a fingerprint of said user.

38. The method of claim 30, further comprising the step of authenticating said user corresponding to said print job, with the authenticating comprising verifying an identification card or badge.

39. The method of claim 30, further comprising the step of authenticating said user corresponding to said print job, with the authenticating comprising accepting and verifying an identifier code input by said user.

40. A job store for a pull-based presentation output system, comprising:
a job storage storing one or more jobs from a plurality of job submission clients; and
a driver storage storing one or more drivers for converting a job into a format used by a corresponding presentation output device;
wherein said job store receives a job from a job submission client, stores said job in said job storage, receives a pull command from a presentation output device when the presentation output device is one of idle and nearly finished with a current and without receiving further input from a user of the job submission client, retrieves said job from said job storage, applies a driver for converting that job into a format used by the presentation output device sending the pull command and outputs said job to said presentation output device sending the pull command, wherein said job store is able to receive said job from said job submission client in a neutral format.

41. The job store of claim 40, wherein said presentation output device comprises at least one of a display device, a projector, an electronic paper device, a three-dimensional printer and a hologram generator.

42. The job store of claim 40, further comprising a job store interface for use by said job submission clients, said job store interface converting said job into said neutral format used by said job store to store jobs in said job storage.

43. The job store of claim 40, further comprising a job store interface for use by said job submission clients, said job store interface accepting an identification of a specific presentation output device to which a corresponding job is to be provided.

44. The job store of claim 40, wherein said job store accepts said job from said job submission client in encrypted form.

45. The job store of claim 40, wherein said job store receives user authentication information associated with a job and outputs that job to a presentation output device only upon receipt of corresponding user authentication information.

46. The job store of claim 40, wherein said job is a print job and said presentation output device comprises a printer, said driver storage storing a printer driver corresponding to said printer.

47. The job store of claim 40, wherein said job store provides said job to a second output presentation device if said job store receives a decline of said job from a first output presentation device.

48. The job store of claim 40, wherein said job store comprises first and second job stores that are chained, said first job store being in communication with a job submission client and said second job store being in communication with said presentation output device such that said first and second job stores appear as a single job store to said job submission client and said presentation output device.

49. The job store of claim 40, wherein the job store receives said job from a job submission client in said neutral format produced by a job store driver corresponding to said job store, where said job store driver is provided to said job submission client for outputting said job in said neutral format to said job store.

50. A job store for a pull-based printing system, comprising:
a job storage storing one or more print jobs to be printed from a plurality of job submission clients; and
a printer driver storage storing one or more printer drivers;
wherein said job store receives a print job from a job submission client converted into a printer-neutral format, stores said printer-neutral format converted print job in said job storage, receives a pull command from a printer when the printer is one of idle and nearly finished with a current print job and without receiving input from a user of the job submission client, retrieves said print job from said job storage, retrieves a printer driver from said printer driver storage, applies said printer driver to said printer-neutral format converted print job to convert the print job into a format suitable for the printer and provides said print job to said printer.

51. The job store of claim 50, wherein said job store pushes said print job to a specified printer.

52. The job store of claim 50, wherein said job store pushes said print job to a specified printer and wherein said print job includes an association to said specified printer.

53. The job store of claim 50, wherein said job store provides said print job to another printer if said job store receives a decline of said print job by said printer.

54. The job store of claim 50, wherein said job store comprises first and second job stores that are chained, said first job store being in communication with a job submission client and said second job store being in communication with said printer such that said first and second job stores appear as a single job store to said job submission client and said printer.

55. The job store of claim 50, wherein said job store further comprises stored printer information comprising a name and address for each of a number of printers.

56. The job store of claim 55, wherein said printer information further comprises, for each of said number of printers, either a printer capacity or printer location.

57. A presentation output system, comprising:
a job store for communicating over a digital network with one or more job submission clients, with said job store accepting and holding output jobs from said job submission clients, and with said job store storing the output jobs accepted front said job submission clients in a neutral presentation output device format;
wherein said job store further comprises a driver storage that stores one or more drivers for the presentation output device, and with the job store converting the output jobs from the neutral presentation output device format to a format suitable for use by one or more presentation output devices pulling the output jobs from the job store;
wherein said job store receives a pull command from a presentation output device when the presentation output device is one of idle and nearly finished with a current job and without receiving further input from a user of the job submission client, retrieves an output job from a job storage, applies a driver for converting that output job into a format used by the presentation output device sending the pull command and outputs said output job to said presentation output device sending the pull command, wherein said job store is able to receive said output job from said job submission client in said neutral presentation output device format.

58. The presentation output system of claim 57, wherein a new presentation output device added to said output system automatically informs said job store that said new presentation device is being added.

59. The presentation output system of claim 57, with said job store further comprising a decryption routine and wherein an output job is encrypted by a job submission client and is decrypted by a receiving presentation output device.

60. The presentation output system of claim 57, further comprising a job store interface for use by said job submission clients, said job store interface accepting an identification of a specific presentation output device to which a corresponding output job is to be provided.

* * * * *

UNITED STATES PATENT AND TRADEMARK OFFICE
CERTIFICATE OF CORRECTION

PATENT NO. : 8,681,352 B2
APPLICATION NO. : 10/125804
DATED : March 25, 2014
INVENTOR(S) : Rajesh K. Shenoy et al.

It is certified that error appears in the above-identified patent and that said Letters Patent is hereby corrected as shown below:

In the claims

In column 10, line 62, in Claim 3, delete "claim l," and insert -- claim 1, --, therefor.

In column 12, line 30, in Claim 21, delete "said." and insert -- said --, therefor.

In column 13, line 48, in Claim 36, delete "store o" and insert -- store to --, therefor.

In column 14, line 8, in Claim 40, delete "current" and insert -- current job --, therefor.

In column 15, line 31, in Claim 57, delete "front" and insert -- from --, therefor.

Signed and Sealed this
Twelfth Day of January, 2016

Michelle K. Lee
*Director of the United States Patent and Trademark Office*